US007156741B2

(12) United States Patent
Hornik et al.

(10) Patent No.: US 7,156,741 B2
(45) Date of Patent: Jan. 2, 2007

(54) GAMING DEVICE FOR WAGERING ON MULTIPLE GAME OUTCOMES

(75) Inventors: Jeremy M. Hornik, Chicago, IL (US); Larry J. Pacey, Prospect Heights, IL (US)

(73) Assignee: WMS Gaming, Inc., Waukegan, IL (US)

( * ) Notice: Subject to any disclaimer, the term of this patent is extended or adjusted under 35 U.S.C. 154(b) by 695 days.

(21) Appl. No.: 10/355,866

(22) Filed: Jan. 31, 2003

(65) Prior Publication Data

US 2004/0152509 A1 Aug. 5, 2004

(51) Int. Cl.
*A63F 13/00* (2006.01)

(52) U.S. Cl. .......................................... 463/40; 463/30

(58) Field of Classification Search .................. 463/25, 463/30, 40

See application file for complete search history.

(56) References Cited

U.S. PATENT DOCUMENTS

| | | | |
|---|---|---|---|
| 4,856,787 | A | 8/1989 | Itkis |
| 5,178,395 | A | 1/1993 | Lovell |
| 5,393,057 | A | 2/1995 | Marnell, II |
| 5,531,448 | A | 7/1996 | Moody |
| 5,732,950 | A | 3/1998 | Moody |
| 5,823,873 | A | 10/1998 | Moody |
| 5,890,962 | A | 4/1999 | Takemoto |
| 6,079,711 | A | 6/2000 | Wei et al. |
| 6,159,095 | A | 12/2000 | Frohm et al. |
| 6,203,428 | B1 | 3/2001 | Giobbi et al. |
| 6,394,902 | B1 | 5/2002 | Glavich et al. |
| 6,398,645 | B1 | 6/2002 | Yoseloff |
| 6,511,068 | B1 | 1/2003 | Sklansky et al. |
| 6,652,378 | B1 * | 11/2003 | Cannon et al. ............... 463/20 |
| 6,656,040 | B1 | 12/2003 | Brosnan et al. |
| 6,656,044 | B1 | 12/2003 | Lewis |
| 6,695,696 | B1 | 2/2004 | Kaminkow |
| 2002/0045474 | A1 | 4/2002 | Singer et al. |
| 2003/0060268 | A1 | 3/2003 | Falconer |
| 2004/0072619 | A1 | 4/2004 | Brosnan et al. |
| 2004/0106446 | A1 | 6/2004 | Cannon et al. |

FOREIGN PATENT DOCUMENTS

| | | |
|---|---|---|
| WO | WO 97/27570 | 7/1997 |
| WO | WO 99/10849 | 3/1999 |
| WO | WO 02/099760 A2 | 12/2002 |

* cited by examiner

*Primary Examiner*—Kim Nguyen
(74) *Attorney, Agent, or Firm*—Jenkens & Gilchrist

(57) ABSTRACT

Systems and methods for wagering on game outcomes allow a player to wager on game outcomes resulting from linked gaming devices linked to a primary gaming device being played by the player. A primary game display shows game plays and outcomes and allows wagering on a primary game and a linked game display shows game plays and outcomes and allows wagering on linked games. Both the primary and linked gaming devices may be the same type of gaming device, or they may be two different types of gaming devices, such as gaming devices for playing slot games, card games, keno, and the like. Further, either or both of the primary and linked games may allow bonus game outcomes resulting in a bonus game having bonus game awards.

38 Claims, 10 Drawing Sheets

GAMING DEVICE FOR WAGERING ON MULTIPLE GAME OUTCOMES

BACKGROUND OF THE INVENTION

Gaming devices, such as slot machines, card game machines, keno machines, and other machines for wagering, have become a staple of the casino industry. Different aspects of gaming devices appeal to players and casino operators. Players appreciate lively, entertaining games that allow for a variety of game outcomes to keep their interest. Casino operators appreciate these qualities as well, because they attract players and result in repeat play, but casino operators further value gaming machines which allow for fast game resolution and a variety of types of wagering.

Players of gaming devices have various ways of determining which gaming devices are worth playing at particular times. For example, if a particular gaming device makes several payoffs in a short period of time, there will be a perception of that gaming device as a "hot" gaming device worth playing. There is, however, an incentive for a player playing a hot gaming device to continue playing that device, so that onlookers will not have the opportunity to try their own hands at the hot device. Further, many gaming devices use fairly simple games and controls, such as controls for merely initiating a spin of slot machine reels, or selecting cards from a dealt hand. Thus, players generally spend less than all of their attention on a single game. Both casino operators and players value gaming situations that engage players more completely, and the lack of alternative gaming modes for players to pay attention to results in a less engaging gameplay experience.

The combination of: (a) players spending less than all their attention on a single game; and (b) players noticing other "hot" machines, creates in players a feeling that they would rather be playing the games they are noticing rather than the games they are playing. There exists a need for a gaming system and method that more completely engages a player by providing an opportunity for a player to participate in the gaming on a particularly exciting machine.

SUMMARY OF THE INVENTION

According to one embodiment of the present invention, a primary gaming device is linked to one or more linked gaming devices. The primary game device provides a player with wagering options for a primary game and further provides the player with information regarding linked games and options for wagering on linked games.

According to another embodiment of the present invention, a primary gaming device is provided with a primary game display allowing a player to view and wager on a primary game and a linked gaming display allowing a player to view and wager on linked games provided by gaming devices in communication with the primary gaming device.

According to another embodiment of the present invention, a primary gaming device provides a primary game having one or more possible primary bonus game outcomes and further provides a linked game display displaying results of linked games played on linked gaming devices, with the linked games on linked gaming devices having one or more possible linked bonus game outcomes.

According to still another embodiment of the present invention, a primary game is wagered upon concurrently with wagering upon one or more linked games, with wagering in a linked game being put on hold upon a linked bonus game outcome occurring. The linked bonus game is played in a primary game display following the completion of a primary game, a primary game outcome, or a primary bonus game outcome.

The above summary of the present invention is not intended to represent each embodiment, or every aspect, of the present invention. This is the purpose of the figures and the detailed description which follow.

BRIEF DESCRIPTION OF THE DRAWINGS

The foregoing and other advantages of the invention will become apparent upon reading the following detailed description and upon reference to the drawings.

Figure 1:
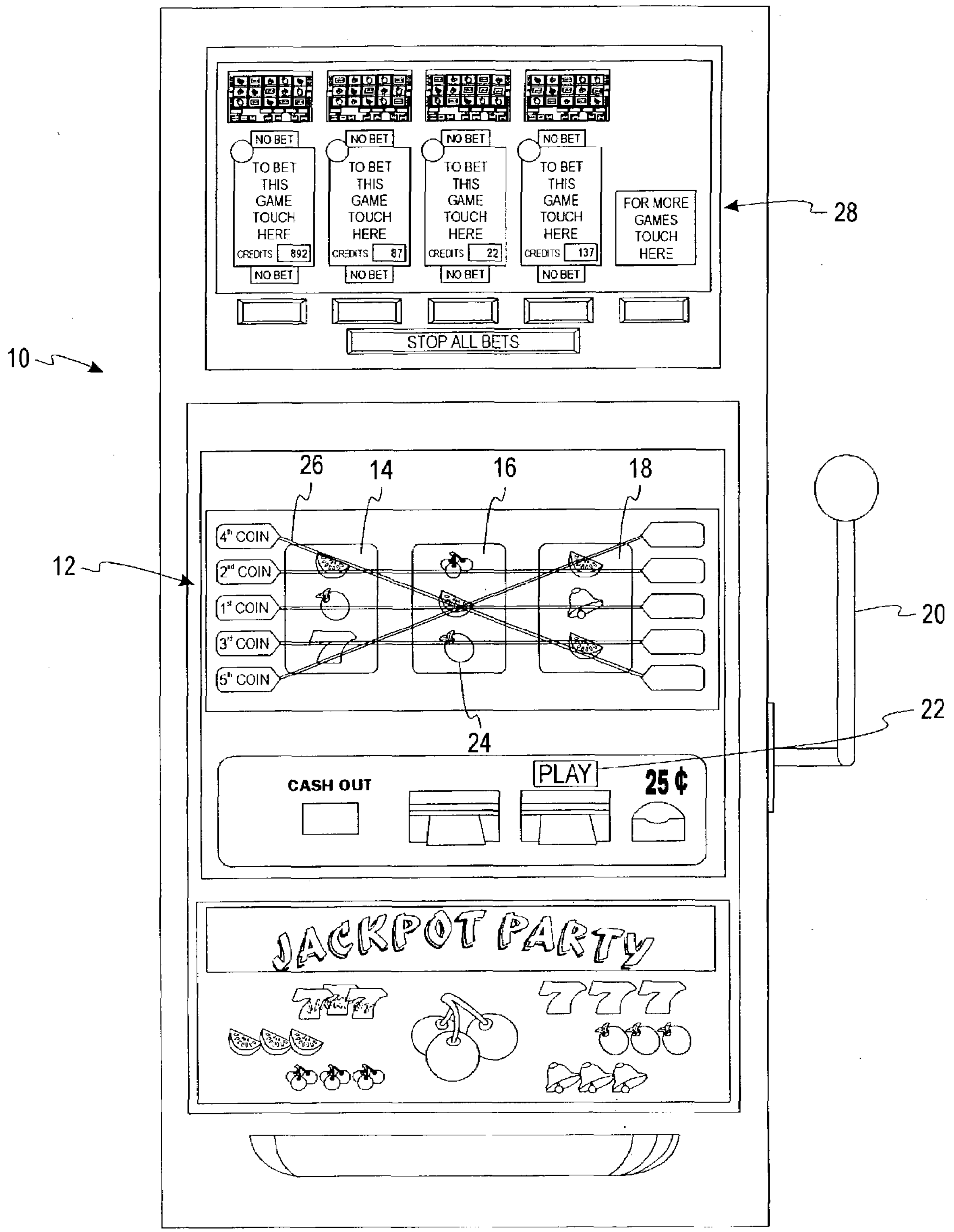
FIG. 1 is a front view of a gaming device according to one embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Gaming devices and methods according to the present invention present a player with a number of gaming opportunities, and a variety of game types may be used in connection with the present invention to allow players to participate in more involving gaming experiences. FIG. 1 shows a gaming device 10 according to one embodiment of the present invention. The gaming device 10 is a slot machine having a primary display 12 displaying a number of game reels 14, 16, and 18. Slot machine embodiments of the present invention may be implemented with video "reels." Accordingly, the term "reel" shall be understood herein to encompass video, as well as mechanical, implementations. Spinning of the game reels is initiated when a player pulls a handle 20 or depresses a play switch 22. In addition to or instead of the game controls as shown in FIG. 1, game play decisions may be executed via touch screens displaying screen areas corresponding to allowable player choices. The game reels 14, 16, and 18 stop after spinning, and a player is awarded with a number of credits depending on which game symbols 24 are displayed in the primary display 12, and where the game symbols 24 are displayed after spinning of the game reels.

Wagering may be accomplished in a number of ways. According to some embodiments of the present invention, wagering and payoffs are accomplished using a credit system, with each credit representing a basic value of the gaming device. For example, on a $0.25 slot machine, each credit is worth one quarter, while on a $1.00 slot machine, each credit is worth one dollar. Credits are allocated to the player based on money input into the machine, either in the form of cash or in the form of another payment means, such as a credit card, debit card, smart card, or the like. Alternatively, devices and methods according to the present invention may be implemented using a cash-only system in which dollar values rather than credits are depicted on game display areas.

According to some embodiments of the present invention, gaming may be enhanced by providing the player with a number of pay lines 26. Multiple pay lines 26 allow a player to win with a number of combinations of symbols displayed in the primary display 12 in alternative patterns. According to some embodiments of the present invention, the number of pay lines 26 available for winning combinations increases as a player's wager increases, with each additional credit wagered increasing the number of pay lines available. The embodiment of FIG. 1 shows five pay lines available, but embodiments with more or fewer pay lines are available. The upper boundary of the number of pay lines available to a player depends on the number of symbols visible in the primary display 12 and on the complexity of the game played. According to some embodiments of the present invention, a gaming device adapted for the play of a slot game may be provided with twelve or more pay lines. Further, it is to be understood that alternative shapes for pay lines may be provided, with alternative shapes not necessarily being linear. For example, pay lines may be provided in zig-zags, v-shapes, inverted v-shapes, and other shapes as known in the gaming art.

Several types of basic game outcomes are possible, according to the configuration of the symbols 24 after the play of a game. Generally, basic game outcomes result in payoffs of credits to a player or the loss of credits as a result of a non-winning play. Some basic game outcomes may result in bonus games for the player. A bonus game may be displayed in the primary display 12 and allow a player to make choices which enable bonus outcomes beyond the basic game outcomes made available by the gaming device 10. Alternatively, the bonus game may be displayed in a secondary display 28. Implementations of bonus games are described in U.S. Pat. No. 6,190,255 B1 which is incorporated herein by reference in its entirety.

Figure 2:
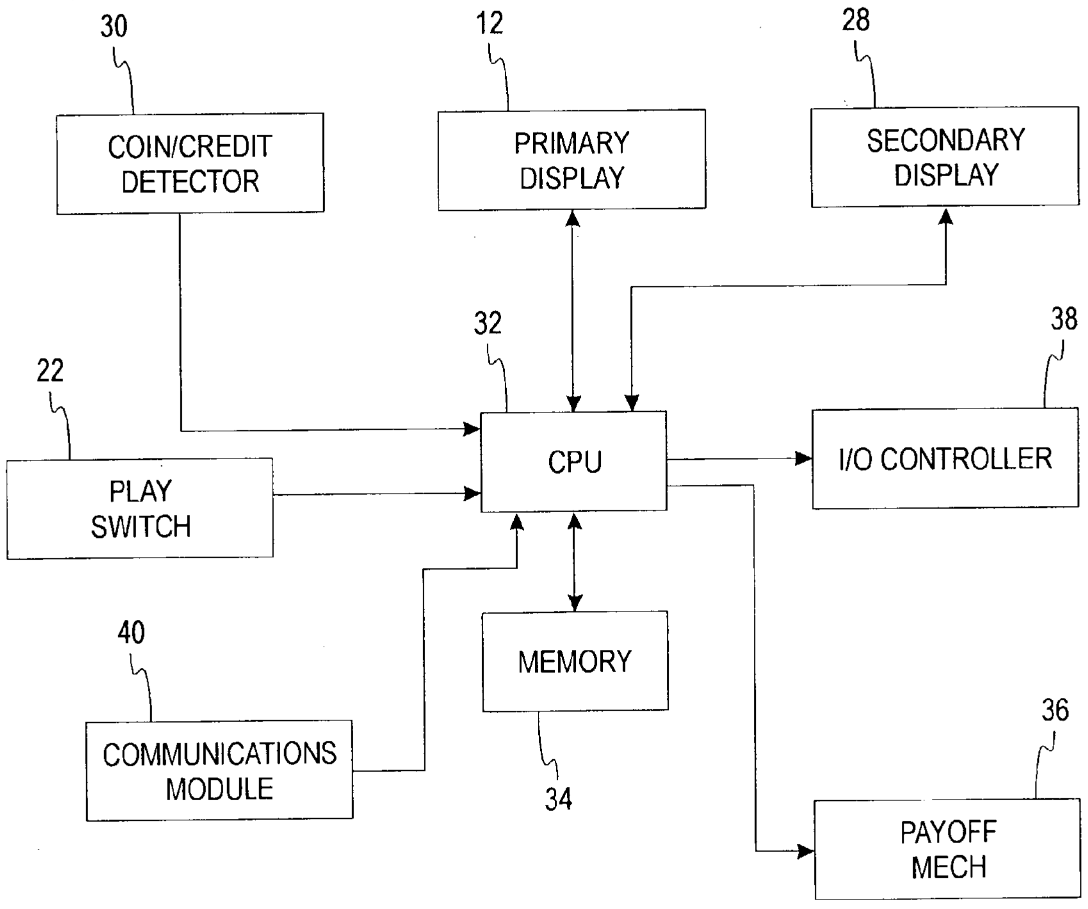
FIG. 2 is a block diagram showing the operation of a gaming device according to one embodiment of the present invention.

Turning now to FIG. 2, a control system for operating a gaming device according to one embodiment of the present invention is shown. A coin/credit detector 30 signals a CPU 32 when a player has inserted a number of coins or other currency or when a player has wagered a number of credits. The CPU 30 then, either automatically in response to a maximum wager or following a player's selection of a play switch 22, operates to execute a basic game program causing the primary display 12 to display a primary basic game, which may include spinning reels, dealing cards, selecting keno or bingo numbers, and/or other types of game activities. A system memory 34 stores control software, operation instructions, and data associated with the gaming device 10. A payoff mechanism 36 is operable in response to instructions from the CPU 32 to award a payoff of coins or credits to the player in response to certain winning outcomes, which may occur in the basic game or a bonus game, in accordance with a pay table stored in the system memory 34. A separate I/O controller 38 may be employed to enable the gaming device 10 to display special information using customized display devices or to receive inputs regarding games being wagered upon.

Further, a communications module 40 coupled to the CPU 32 may send information relating to the gaming device 10 to a central information system and/or other, linked gaming devices, receive casino and gameplay related information from a central information system, or receive information from linked gaming devices. Communications modules 40, may be network cards, for example, in an embodiment where gaming devices are connected in a local area network (LAN). Alternatively, communications modules 40 may be modems. According to some embodiments of the present invention, a CPU 32 is further coupled to a secondary display 28, which may be adapted to display linked games or graphics associated with a primary game. Either or both of the primary display 12 and the secondary display 28 may be touch-screen displays adapted to display choices to a player, accept player selections, and forward information on player selections to the CPU 32. This may also be accomplished via the use of light pens as known in the gaming art.

Figure 3:
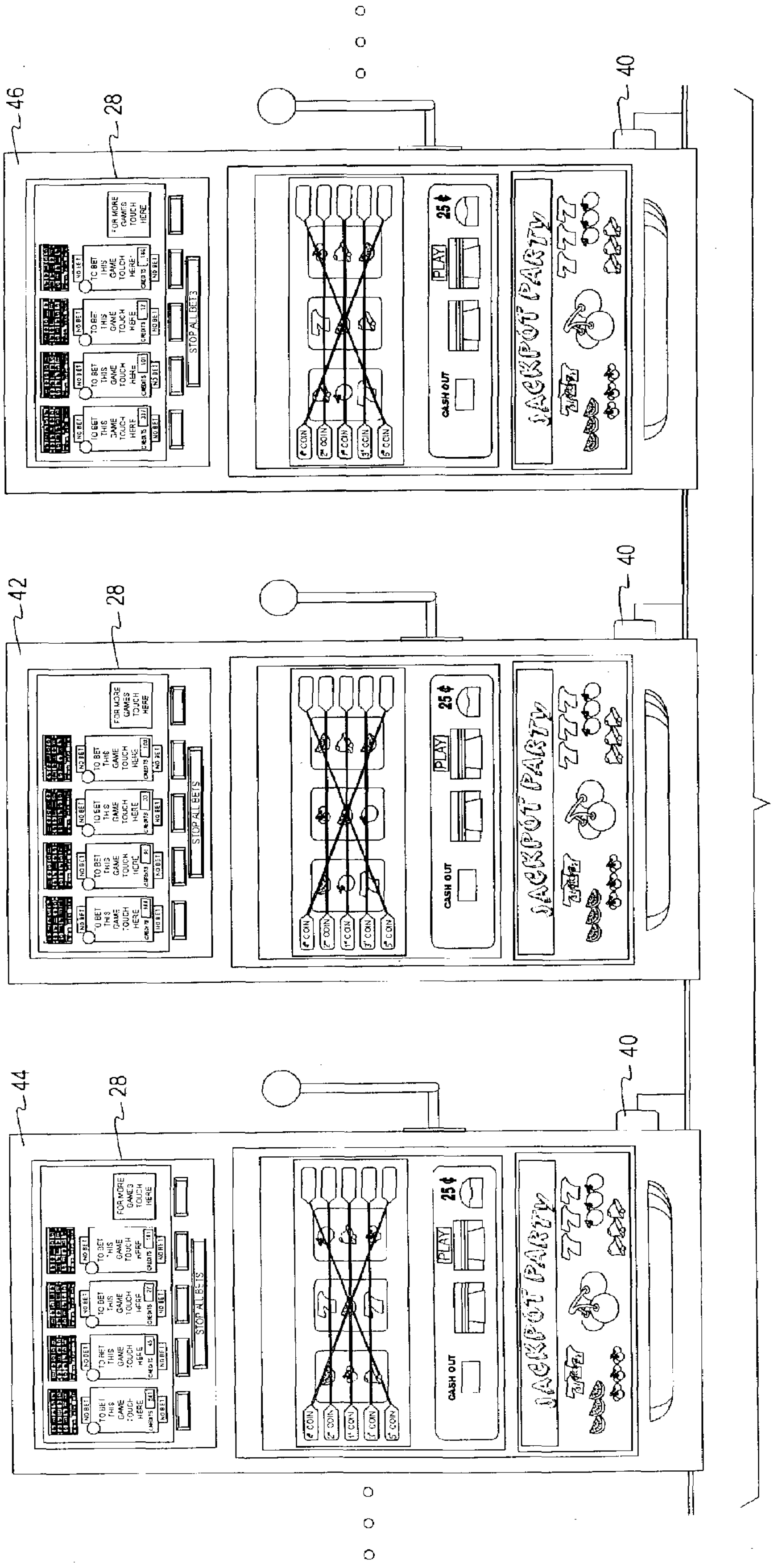
FIG. 3 is a front view of a series of gaming devices according to one embodiment of the present invention.

Gaming devices may be positioned next to other gaming devices, for example in lines or banks of gaming devices on a casino floor. FIG. 3 shows a primary gaming device 42 flanked by a left gaming device 44 and a right gaming device 46. More gaming devices may be provided in such a series as shown by the ellipses at the sides of the illustrated gaming devices. Further, gaming devices may be arranged in many different ways, including in banks of gaming devices. In the embodiment shown in FIG. 3, the left gaming device 44 and the right gaming device 46 are linked gaming devices with respect to the primary gaming device 42. During play of a primary gaming device 42, a player may recognize that the left gaming device 44 or the right gaming device 46, or both, are awarding more or greater payoffs than the primary gaming device 42 is awarding. The present invention allows a player of the primary gaming device 42 to participate in games being played by linked gaming devices in the hopes of garnering the awards being paid out by those linked devices. In the embodiment shown in FIG. 3, the player of the primary gaming device 42 may choose to wager on the games being played by the left gaming device 44 or the right gaming device 46.

To enable such participation, the gaming devices are provided with communications modules 40 (also see FIG. 2) which enable the transmission of information about each gaming device outside the individual gaming devices and to receive information from other gaming devices. A combination of different types of communications modules may be used where several different types of gaming devices are to be linked together. Communications modules 40 may be used for a variety of reasons. For example, communications modules 40 may be of the type used by a casino to centrally collect information on payoffs and game results on all gaming devices in the casino, or to centrally control aspects of game play on individual gaming devices on a casino floor. The communications modules 40 of the embodiment shown in FIG. 2 are shown as wired modules, but it is to be understood that wireless communication techniques may also be used to implement alternative game selection according to the present invention. Further, while the communications modules 40 are shown extending from game cabinets, it is also contemplated that communications modules may be incorporated within game cabinets.

According to one embodiment of the present invention, gaming devices capable of sending information to and receiving information from one another are considered linked gaming devices. Thus, in FIG. 3, the primary gaming device 42 has to the left gaming device 44 and the right gaming device 46 as linked gaming devices, the left gaming device 44 has the primary gaming device 42 and the right gaming device 46 as linked gaming devices, and the right gaming device 46 has the left gaming device 44 and the primary gaming device 42 as linked gaming devices. Each of the gaming devices shown in FIG. 3 may have several other gaming devices as linked gaming devices. According to one embodiment of the present invention, all gaming devices on a casino floor or within a single casino may be linked to all other gaming devices, thereby allowing players of any gaming device to choose to play along with games being played on any other gaming device. Particular gaming devices may be more popular to play along with, based on word of mouth or players' familiarity with particular gaming devices. Players may be provided, for example, with a visual depiction of a casino map showing game locations within a casino and allowing player choice of particular gaming devices to play along with.

According to another embodiment of the present invention, a primary gaming device may receive information from a linked gaming device without sending information from the primary gaming device to the linked gaming device. Such an embodiment may be useful in an implementation in which only certain gaming devices are adapted to receive information from linked gaming devices and allow wagering on linked games.

Figure 4:
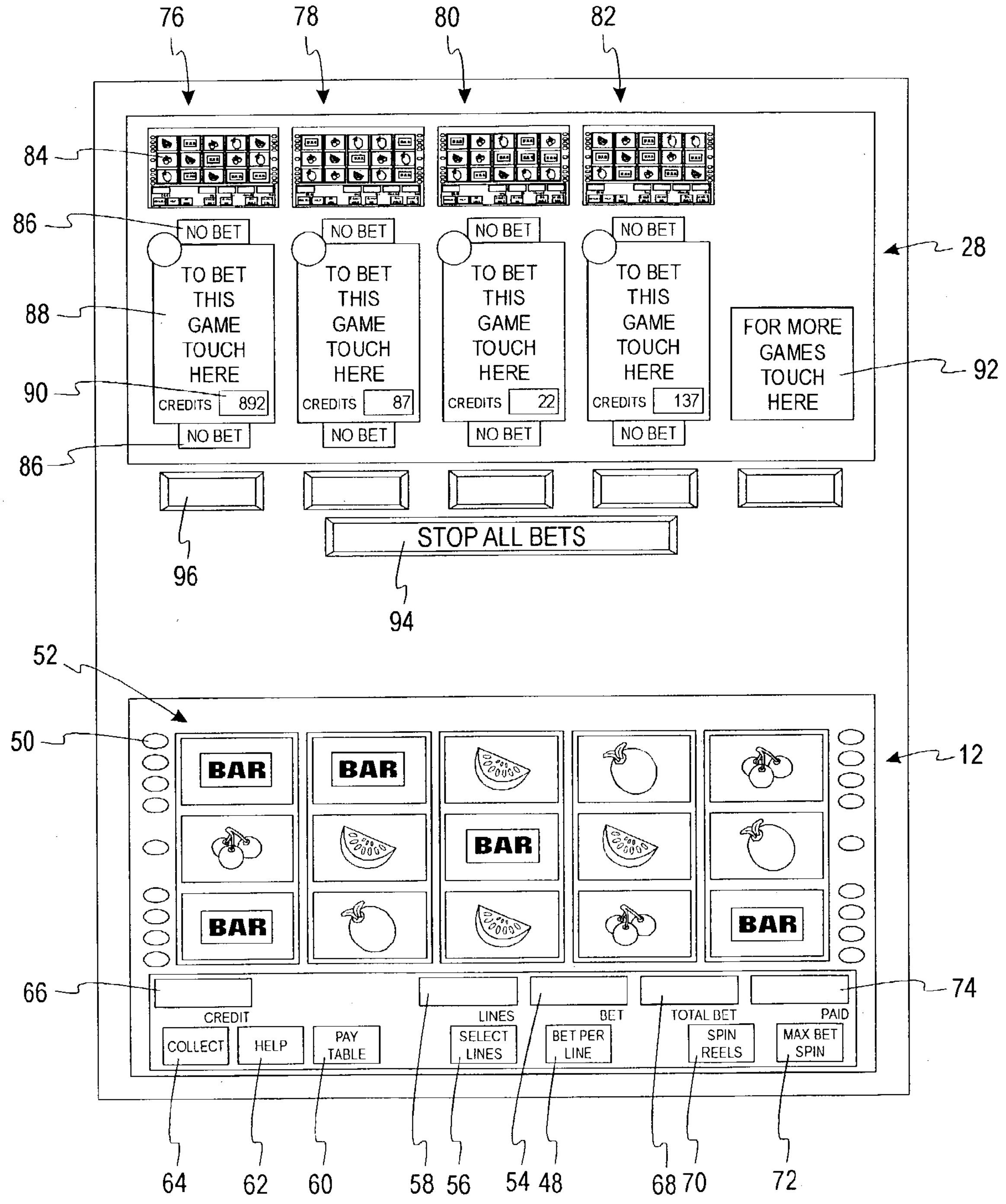
FIG. 4 is a front view of a pair of game displays allowing players to participate on linked games in addition to a primary game.

Selections of linked games for wagering may be enabled by a linked game display provided on a gaming device. The linked game display may be provided as a separate display from a primary game display or as a picture-in-picture or split screen display on a single display. FIG. 4 shows primary and secondary displays 12 and 28 according to one embodiment of the present invention. In the embodiment shown in FIG. 4, the primary and secondary displays 12 and 28 are touch-screen displays allowing players to make wagering and gameplay selections by touching areas of the screen, or a screen overlay, corresponding to desired actions. In the embodiment shown in FIG. 1, the primary display 12 is used to display a primary game; that is, the game that is normally played by the gaming device at which the player is stationed.

The primary display 12 of FIG. 4 displays a number of informational areas and selection areas, or buttons, for player interaction with the touch screen. A wager-per-line button 48 allows the player to select the number of credits to wager on each selected pay line. The embodiment of FIG. 4 includes a nine-pay-line game, as indicated by the pay line indicators 50 along the left and right sides of the game reels 52. A wager-per-line display 54 shows the number of credits wagered on each pay line being played. The number of pay lines a player wants to enable may be chosen with a line selection button 56, with the number of pay lines being displayed in a pay line display 58. Additionally or alternatively, the pay lines being chosen may be displayed using the pay line indicators 50.

Selecting a pay table button 60 allows a player to view the possible payoffs of a gaming device, including payoffs based on a number of credits wagered and a number of pay lines selected. Selecting a help button 62 may light an attendant light to indicate that a player needs assistance, or provide on-screen instructions regarding game play. A collect button 64 allows a player to change all credits into another exchange medium, such as cash from the machine, a credit certificate, or credit to a casino card, credit card, or debit card. The number of credits currently available to the player may be displayed via a credit display 66.

Upon selection of a number of pay lines and the number of credits wagered per pay line, a total wager may be displayed in a total wager display 68. Once a player is satisfied with the wager amount, the player may initiate game play by selecting a reel spin button 70. Rather than manually selecting the number of pay lines and the wager per line, a player may choose to bet the maximum amount on a single spin by selecting a maximum wager spin button 72. Following game play, the number of credits, if any, awarded in a payoff may be displayed in a payoff display 74.

In addition to the games carried out in the primary display 12, a player is given the opportunity to view and participate in linked games as shown in the secondary display 28. In an alternative embodiment, the displays in the primary and secondary displays are switched, or switchable by the player, so that the player may choose an appropriate viewing option depending on which screen the player prefers to focus on. The display area showing linked games and options relating to linked games may be termed a linked game display. Thus, the linked game display may be physically displayed in a primary display or in a secondary display. Alternatively, a linked game display and a primary game display may both be displayed on a single, combined display.

According to one embodiment of the present invention, a linked game display displays one or more linked game areas. The embodiment shown in FIG. 4 shows first, second, third, and fourth linked game areas 76, 78, 80, and 82, though it is to be understood that more or fewer linked game areas may be displayed depending on such factors as the desired complexity of the view and the size of the display area. Each linked game area displays information relating to a game being played on a linked gaming device and buttons for selection by a player to interact with a linked gaming device. In the embodiment shown in FIG. 3, the first linked game area 76 contains a first linked game depiction area 84, which displays linked games and linked game outcomes. Linked game depictions may be done in real time, so that linked games are displayed as they are occurring. Because a linked game may be the same as or different from the primary game being played, the game displayed in a linked game depiction area may closely resemble the primary game, or may be substantially different from the primary game. According to some embodiments of the present invention, linked games may include styles or genres of games different from the primary game. For example, a gaming device having a slot game as a primary game may provide the opportunity to play a card game or a keno game as a linked game, depending on which games are provided by a linked gaming device.

A first linked game participation indicator 86 informs a player as to whether the player is wagering on a first linked game. A first linked game participation button 88 gives the player the option of wagering on the first linked game. A credit indicator 90 displays the number of credits available to the player for wagering. The embodiment of FIG. 4 shows an additional first linked game participation indicator 86. Each of the additional linked game areas contains corresponding features. In addition, a linked game search button 92 may be employed to allow a player to review and search for linked games not already displayed in the linked game display. A wagering termination button 94 allows a player to easily end participation in all linked games by terminating all wagers on linked games. Linked game selection buttons 96 may be employed instead of or in addition to a touch screen display to further allow a player to select and interact with linked games.

Figure 5:
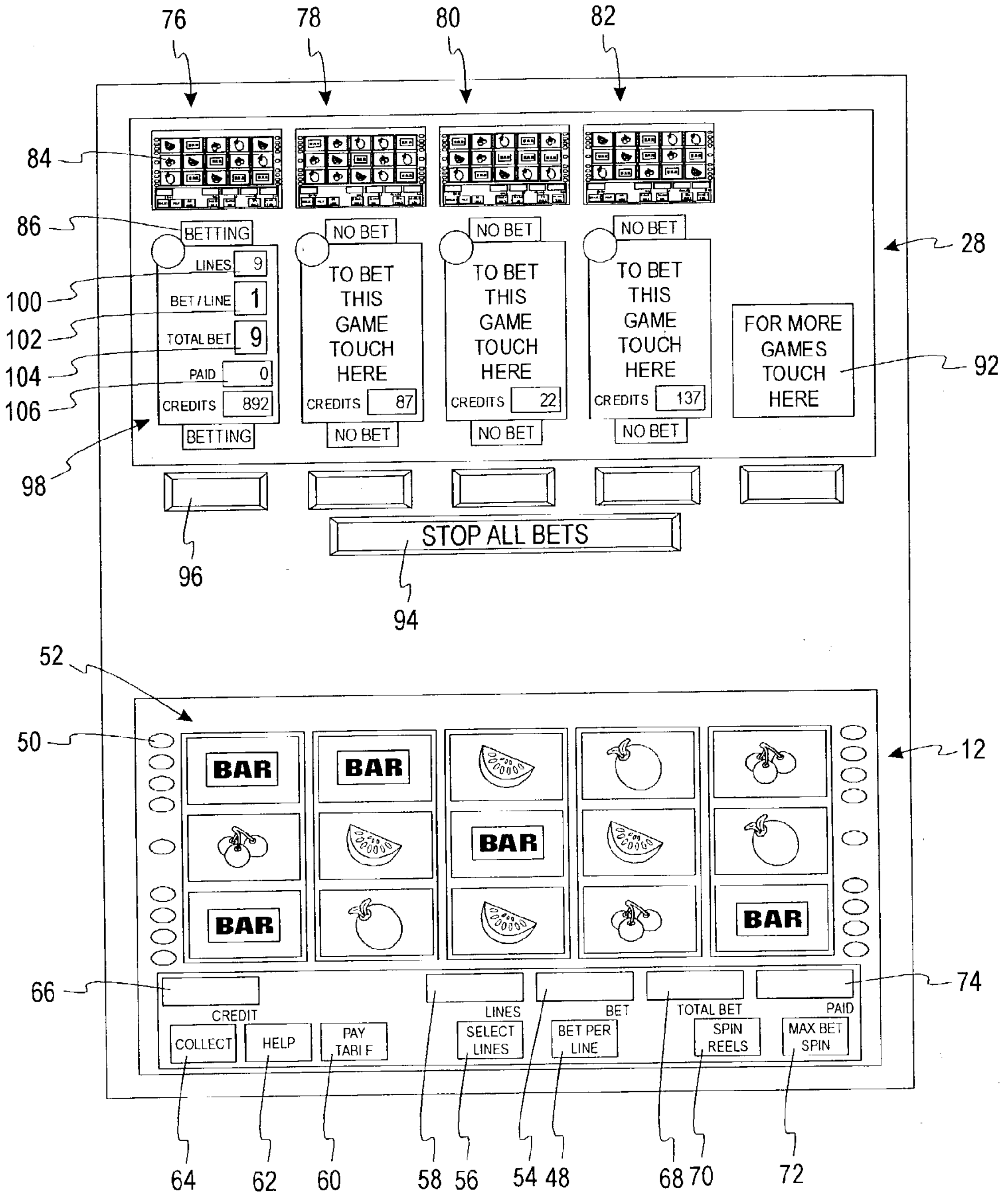
FIG. 5 is a front view of a pair of game displays wherein a player has initiated wagering on a linked game.

The linked game display of FIG. 4 shows that a player has not chosen to wager on any linked games. Turning now to FIG. 5, a linked game display is shown in which a player has chosen to wager on a first linked game. The first linked game area 76 has been altered to display via the first linked game participation indicator 86 that a player is interacting with the first linked game and further to display wagering information with respect to a first linked game. In the embodiment shown in FIG. 5, the first linked game participation button 88 has been replaced with a first linked game wagering display 98.

The first linked game area 76 of FIG. 5 displays information regarding wagering on the first linked game and provides the player with wagering options for the first linked game. A first pay line indicator and selector 100 displays the number of pay lines selected by the player and also serves as a touch screen area to accept input regarding the number of pay lines the player wishes to activate. A first linked game wager-per-line indicator and selector 102 displays the wager, in credits, per pay line and also serves as a touch screen area to accept input regarding the number of credits the player wishes to wager on the outcome for each pay line. A first linked game total wager indicator 104 displays the total credits wagered on the outcome of the first linked game, and a first linked game payoff indicator 106 displays the credit values of any payoffs to the player resulting from the first linked game. A first linked game credit indicator 107 indicates the number of credits available to the player for wagering on the first linked game. According to some embodiments of the present invention, credits in a single credit pool may be wagered on either a primary game or linked games. Alternatively, credits may be allocated by a player for play only in the primary game, only in linked games, or only in specific ones of linked games.

According to one embodiment of the present invention, wagers placed on linked games will remain at the same level for subsequent plays of wagered linked games unless terminated or altered by the player. Alternatively, wagers may be terminated following each play of a linked game, requiring manual renewal of the wager by the player. According to another embodiment, players may be given a choice to match the wagers placed by a person playing a linked game.

A player may be allowed to control only the amount wagered per pay line on a linked game, with the number of pay lines chosen by the player of the linked game, or a player may be allowed to control only the number of pay lines played on a linked game, with the wager per pay line chosen by the player of the linked game. Some linked games may be provided with only one pay line, further simplifying wagering on linked games. Each of these embodiments allows a player to initiate and control wagering on a linked game with simple serial presses of linked game selection buttons 96 or within linked game areas on a linked game display.

Figure 6:
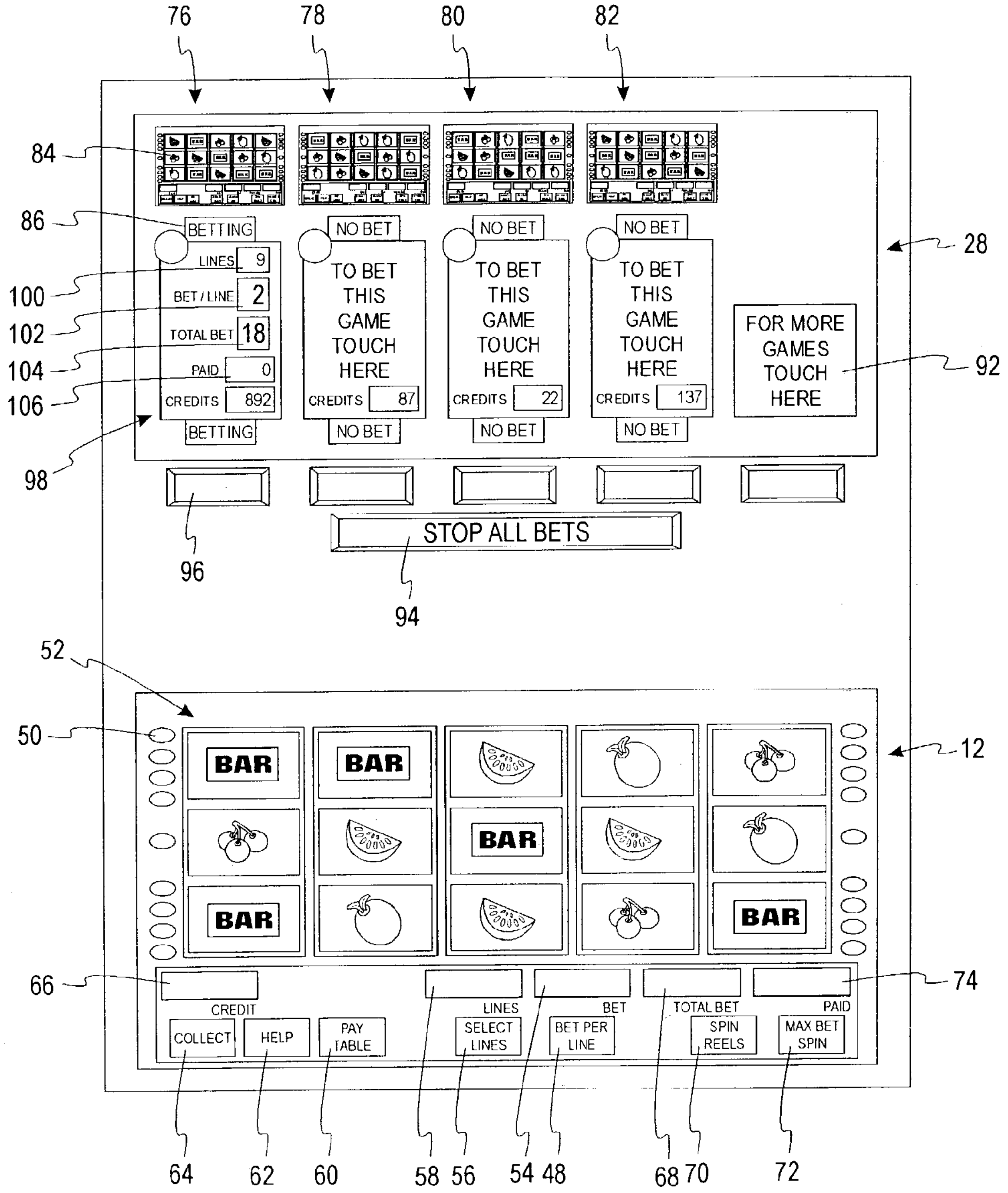
FIG. 6 is a front view of a pair of game displays wherein a player has continued wagering on a linked game.

Turning now to FIG. 6, the first linked game area 76 of the linked game display shows that the player has chosen to bet two credits per pay line, with a total of nine pay lines, for a total wager of eighteen credits. At this point, the player may choose to finalize the wager. According to one embodiment of the present invention, wagered credits are deducted from a player's total credits as soon as a wager is finalized. In the embodiment shown in FIG. 6, the outcome of the first linked game will result in a reward for the player based on a two credit per pay line wager, a bonus game outcome based on a two credit per pay line wager, or the deduction of eighteen credits with no payoff where the game play results in an outcome without a payoff.

Figure 7:
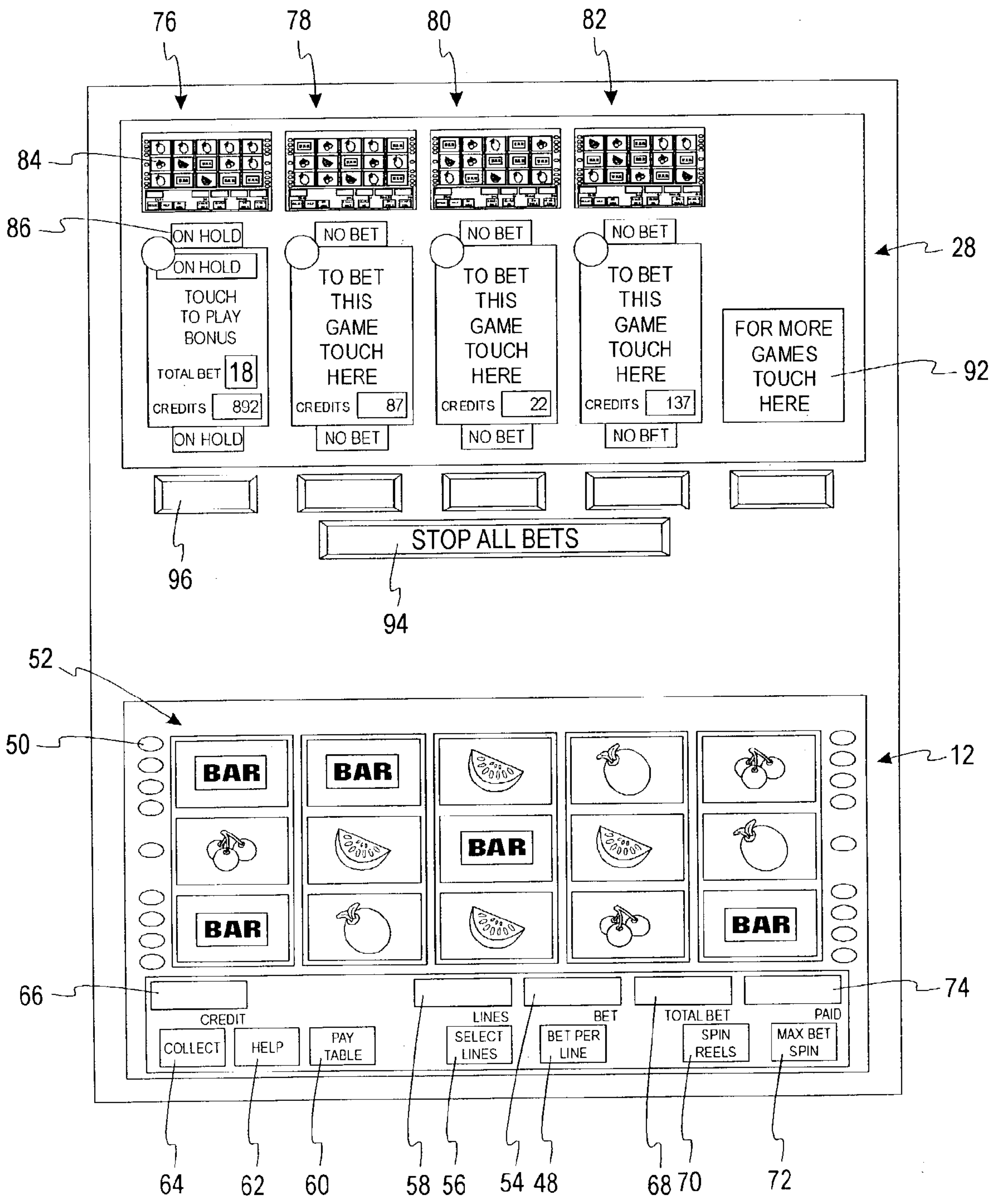
FIG. 7 is a front view of a pair of game displays wherein a linked game has been put on hold pending player input.

Turning now to FIG. 7, a linked game display is shown wherein a linked game has ended in a linked bonus game outcome. A variety of linked bonus game outcomes are available according to certain embodiments of the present invention. According to one embodiment of a linked bonus game, a linked bonus game requires a player to make a choice among several possible selections, with the linked bonus game then animating an outcome and making a payoff or other bonus game award depending, or apparently depending, on the choice made by the player. Because a bonus game may require that a player make some input, and thus may have a higher level of interactivity than a primary or a linked non-bonus game, options are provided by the present invention to enable a player to participate in a linked bonus game in the same way that a player would participate in a bonus game resulting in the primary game being played. Alternatively, a player's outcome on a linked bonus game may be made dependent on a player of a linked game's choices during the linked bonus game.

In the embodiment of FIG. 7, the first linked game area 76 shows that the first linked game has been put on hold pending the player's attention. During the time a linked game is on hold, the player is unable to put additional wagers on the linked game until the linked bonus game is played. According to one embodiment of the present invention, a linked game that is placed on hold will remain on hold until the player touches the linked game area 76 or a linked game selection button 96 associated with the game placed on hold. According to another embodiment of the present invention, a linked game having a linked bonus game outcome will remain on hold until a primary game, primary game outcome, or primary bonus game outcome has been completed in the primary display 12. According to either embodiment, it is preferred to display all bonus games, including primary bonus games and linked bonus games, in a primary display, as shown in FIG. 8.

Figure 8:
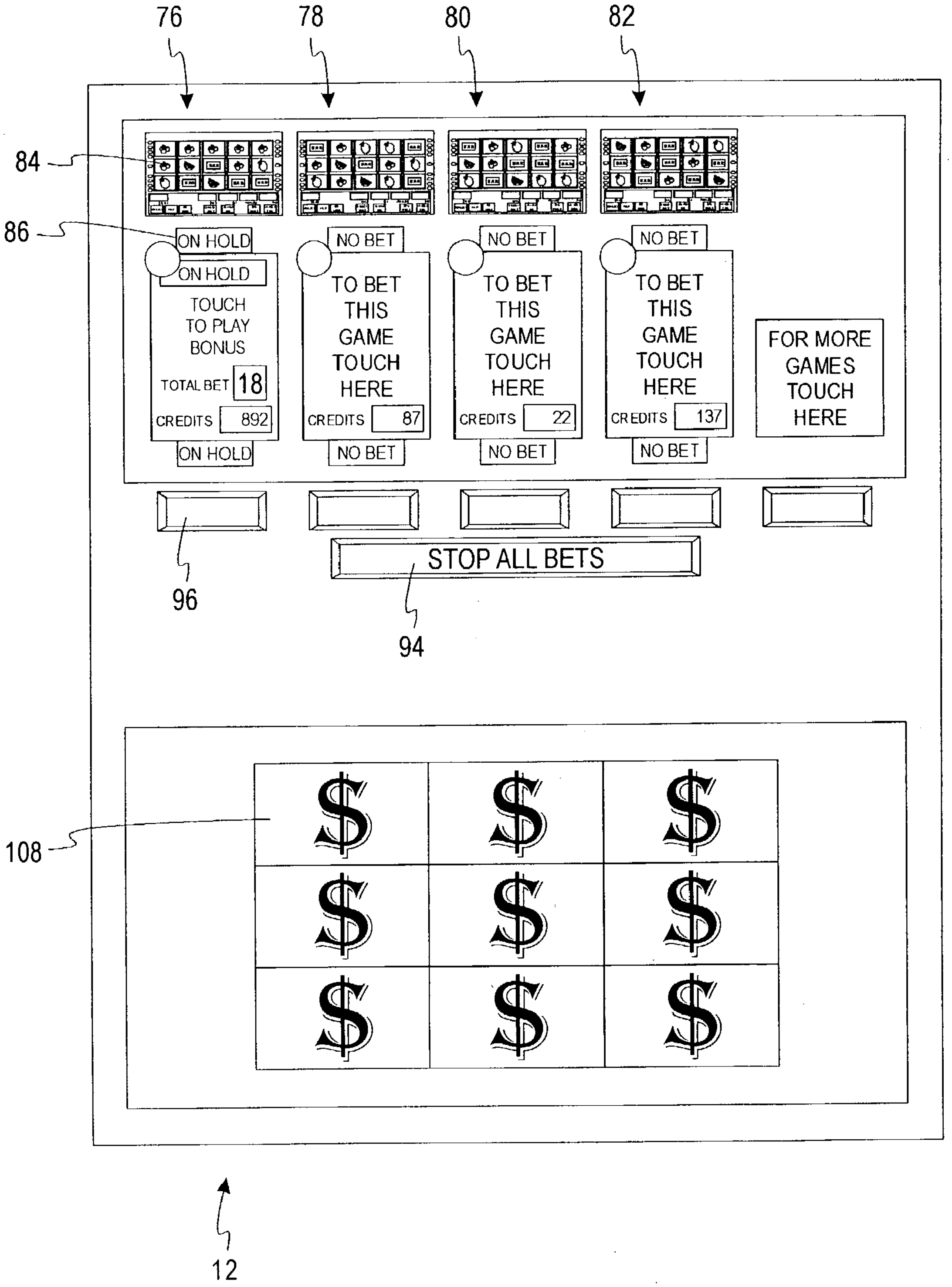
FIG. 8 is a front view of a pair of game displays wherein a player has initiated a bonus game on a linked game.

In the embodiment shown in FIG. 8, the first linked game area 76 indicates that the player's interaction with the first linked game is on hold pending the completion of a linked bonus game, which is shown in the primary display 12. In the bonus game depicted in the primary display 12 of FIG. 8, several bonus game selection boxes 108 are displayed. The player may use a touch screen or other input device to select a bonus game selection box. Following the player's selection of a bonus game selection box, a hidden award associated with one or all of the boxes may be displayed to the player. The selection of some boxes may result in no award for the player. Other possible bonus game awards include an award of credits to the player, a chance to select another bonus game selection box, multiple spins or plays of a primary or linked game, or other bonus game awards as are known in the gaming art. Displayed icons in the bonus game selection boxes 108 may be tailored to specific types of games or specific game themes. According to one embodiment of the present invention, all wagering on the primary game and linked games is suspended pending the outcome of a primary bonus game or linked bonus game.

Figure 9:
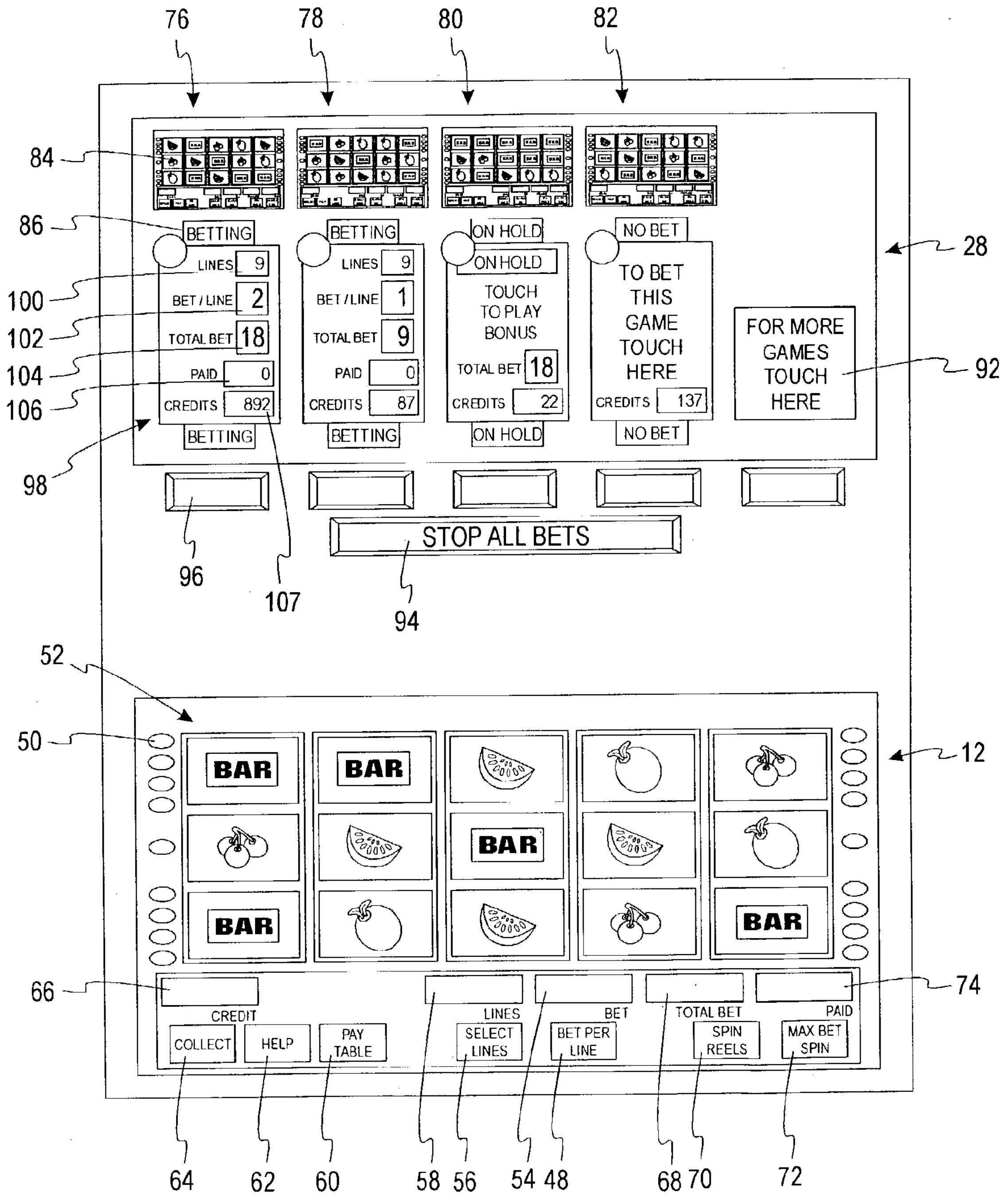
FIG. 9 is a front view of a pair of game displays wherein a player has initiated wagering on more than one linked game.

As shown in FIG. 9, the present invention allows a player to place and manage wagers on a number of linked games played on a number of linked gaming devices. In the embodiment of FIG. 9, a secondary display 28 shows that a player is wagering on a first linked game as shown in the first linked game area 76 and also wagering on a second linked game as shown in the second linked game area 78. A third linked game is on hold as displayed in the third linked game area 80 due to a linked bonus game outcome, and is waiting for a player's input to display the bonus game. A fourth linked game is not being wagered upon, as shown in the fourth linked game area 82. A linked game search button 92 is also displayed.

Figure 10:
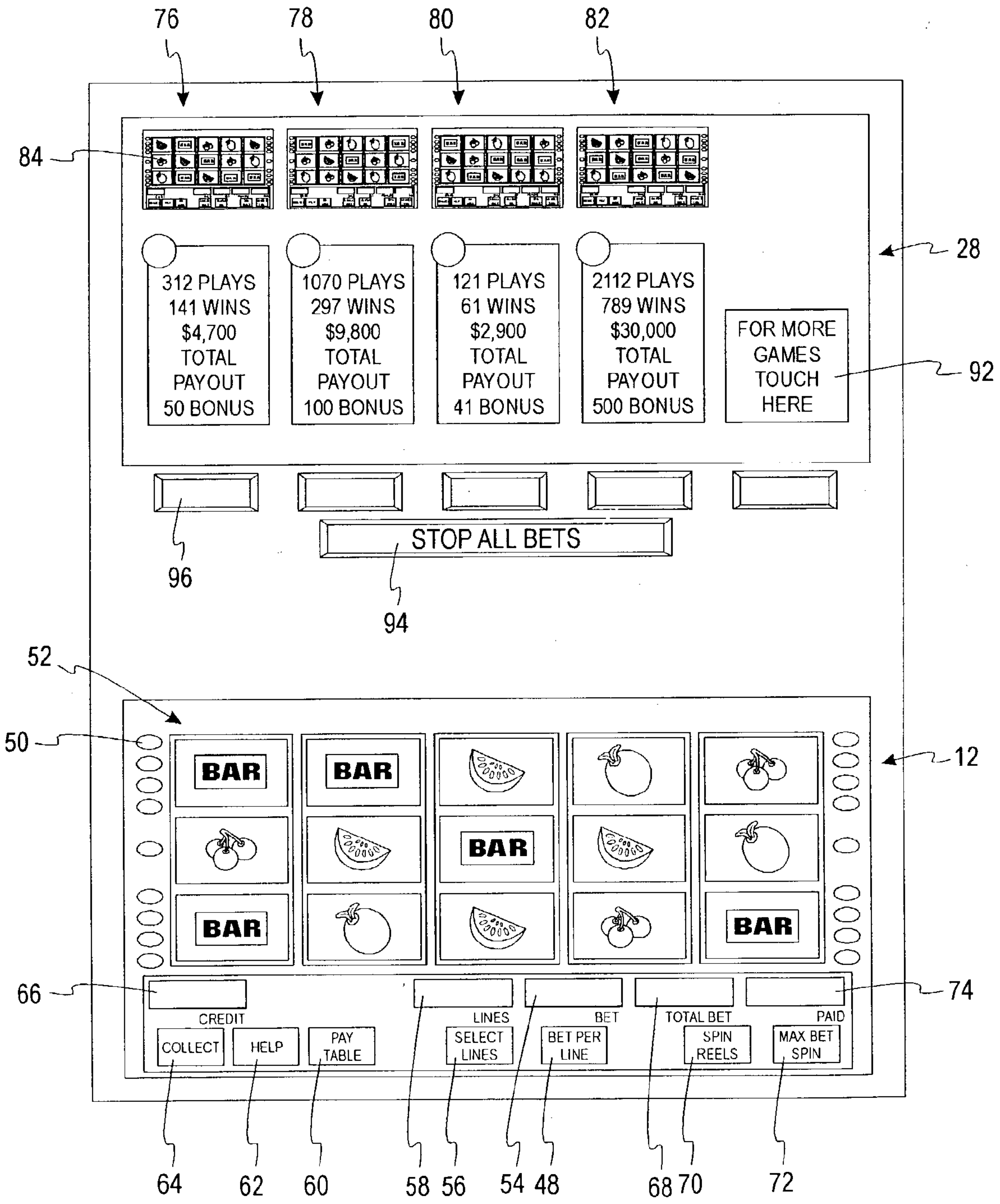
FIG. 10 is a front view of a pair of game displays wherein a linked game display provides historical information regarding linked games.

According to one embodiment of the present invention, a linked game display displays statistical and/or financial information about linked games to allow a player to make an informed decision on which of several linked games to participate in. FIG. 10 shows an embodiment of the present invention in which historical information about linked games is displayed in a linked game display. A player may view this information and decide on which linked game to play based on which game appears to give the greatest odds for winning. Several types of historical information about linked games may be displayed. In the embodiment of FIG. 10, each of the linked game areas 76, 78, 80, and 82 displays information on the total number of times the linked game has been played, the total number of wins resulting from plays of the linked game, the total amount in dollars paid out by the linked game, and the number of bonus-game outcomes granted by the linked game. Other types of information that may be displayed include expected percentage cash back from playing the linked game and the total amount wagered by players of the linked game.

It is to be understood that gaming devices and methods according to the present invention may take a variety of forms. For example, in an embodiment having two displays, primary and secondary displays may be implemented using a variety of types of display technologies, including CRTs, LCDs, and plasma displays. According to one embodiment of the present invention, a gaming device 10 is adapted to accept a player card at a player card acceptor 23, shown in FIG. 1, or otherwise accept player identification information. This player identification information may be linked to past plays by the player, allowing a gaming device to provide in a linked game display linked games that the player has played before or shown a particular affinity for over time. Alternatively or in addition, games which a player has not yet tried, but which have qualities which would appeal to the player, may be presented in a linked game display. Further, while several embodiments of the present invention have been described as implemented at casino sites, it is to be understood that the principles of the present invention may be applied wherever one gaming device is capable of transmitting information to and receiving information from another gaming device.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A system for wagering on linked games via a primary gaming device comprising:

a primary gaming device providing a primary game having primary game outcomes on a primary game display, said primary gaming device further having a linked game display; and one or more linked gaming devices coupled, via respective communication links, to said primary gaming device, said linked gaming devices providing linked games having linked game outcomes, one or more of said linked games being displayed on said linked game display of said primary gaming device, at least one of said communication links being established without communicating information relating to an identity of a player of said primary gaming device, wherein said linked game display includes one or more linked game areas, each of said linked game areas having a linked game wager indicator indicating whether a linked game is being wagered upon by a player of said primary gaming device and a linked game depiction displaying the play of said linked games and further displaying said linked game outcomes.

2. The system of claim 1 wherein said primary game display and said linked game display are displayed on a single display screen.

3. The system of claim 1 wherein said primary game display is provided on a first display screen and said linked game display is provided on a second display screen.

4. The system of claim 1 wherein at least one of said linked game outcomes is a linked bonus game outcome.

5. The system of claim 4 wherein said linked bonus game outcome causes said primary game display to change to a linked bonus game display upon completion of any primary game or primary game outcome then in progress.

6. The system of claim 1, wherein said primary gaming device further includes at least one input for accepting a wager on one of said linked games.

7. A method for accepting wagers on primary games and linked games comprising:

providing, on a primary gaming device, a primary game having primary game outcomes;

providing, on said linked gaming device a linked game having linked game outcomes;

receiving from said linked gaming device at said primary gaming device at least information regarding a linked game depiction on said linked gaming device;

displaying linked game information associated with said linked gaming device on said primary gaming device; and accepting inputs at said primary gaming device, said inputs including wagering commands related to said linked game.

8. The method of claim 7 wherein at least one of said linked game outcomes is a linked bonus game outcome and further comprising pausing said primary game and displaying said linked bonus game outcome on said primary gaming device.

9. The method of claim 7 wherein accepting inputs at said primary gaming device comprises accepting inputs regarding whether to wager on said linked game and amounts to wager on said linked game.

10. The method of claim 7 wherein receiving information from said linked gaming device includes receiving information regarding historical performances of the linked gaming device.

11. The method of claim 10 wherein displaying said linked game information on said primary gaming device includes displaying the information regarding the historical performances of the linked gaming device.

12. The method of claim 7 wherein displaying said linked game information on said primary gaming device includes displaying said linked game depiction.

13. The method of claim 7, further comprising, prior to displaying one of said linked game outcomes on said linked gaming device, accepting at said primary gaming device a wagering command related to said linked game and at said linked gaming device a wagering command related to said linked game.

14. An electronic video gaming machine controlled by a processor in response to a wager comprising:

a processor coupled to a coin and credit detector and controlling a primary game in response to a wager;

a memory coupled to said processor and containing information for controlling the play of said primary game;

a primary display coupled to said processor and displaying said primary game;

a communications module coupled to said processor and adapted to receive linked game information regarding linked games from one or more linked gaming devices in communication with said communications module without requiring coordination among a player of said electronic video gaming machine and a player of one of said one or more linked gaming devices;

at least one play switch accepting commands from a player and forwarding the commands to the processor; and a secondary display coupled to said processor and displaying linked game information from said linked gaming machines, wherein said linked game information displayed on said secondary display comprises a depiction of a game being played on one or more of said linked gaming devices.

15. The electronic video gaming machine of claim 14 wherein said primary display is a touch-screen display, said primary display being adapted to forward player selections regarding a primary game from said touch-screen to said processor.

16. The electronic video gaming machine of claim 14 wherein said secondary display is a touch-screen display, said primary display being adapted to forward player selections regarding one or more linked games from said touch-screen to said processor.

17. The electronic video gaming machine of claim 16 wherein said player selections comprise a selection of a number of pay lines to wager on in one or more of said linked games.

18. The electronic video gaming machine of claim 16 wherein said player selections comprise a selection of a wager per pay line in one or more of said linked games.

19. The electronic video gaming machine of claim 14 wherein said linked game information displayed on said secondary display comprises historical information tracking past plays of said linked gaming devices.

20. An electronic video gaming machine for wagering on games comprising:

a primary display for displaying a primary game;

a communications module for linking the gaming machine to at least one linked gaming device providing at least one linked game;

a linked game display for displaying said at least one linked game having a linked game wager indicator indicating whether a linked game is being wagered upon by a player of said electronic video gaming machine; and one or more player input devices for placing wagers on one or both of said primary game and said at least one linked game.

21. The gaming machine of claim 20 wherein said one or more player input devices comprise a primary touch screen for wagering on said primary game and a linked game touch screen for wagering on said at least one linked game.

22. The gaming machine of claim 20 wherein said primary display and said linked game display are displayed on a single display screen.

23. The gaming device of claim 20 wherein said primary display is displayed on a first display screen and said linked game display is displayed on a second display screen.

24. The gaming device of claim 20 wherein said at least one linked game has a bonus game outcome having a linked bonus game display associated therewith, said primary display being adapted to display said linked bonus game display.

25. A method for allowing wagering on multiple games comprising:

providing on a gaming machine a primary display;

displaying on said primary display a primary game;

receiving at said gaming machine linked game information regarding one or more linked games from one or more linked gaming devices, each of said one or more linked games having one or more linked game outcomes;

providing on said gaming machine a linked game display;

displaying on said linked game display one or more linked game areas, each of said one or more linked game areas corresponding to one of said one or more linked games;

displaying within said one or more linked game areas on said linked game display graphical depictions of said one or more linked games;

accepting from a player linked game wagers corresponding to one or more of said linked games; and awarding a payoff to said player if said linked game wagers correspond to payoff outcomes of said linked games.

26. The method of claim 25 wherein accepting from a player linked game wagers corresponding to one or more linked games comprises accepting said linked game wagers via a touch screen device.

27. The method of claim 25 further comprising displaying within said one or more linked game areas on said linked game display historical information regarding said one or more linked games.

28. The method of claim 25 wherein accepting from a player linked game wagers comprises accepting from a player inputs regarding a number of pay lines wagered upon and a wager per pay line.

29. The method of claim 25 wherein said linked games have linked game outcomes including a linked bonus game outcome resulting in play of a linked bonus game, said method further comprising displaying said linked bonus game.

30. The method of claim 29 wherein displaying said linked bonus game comprises displaying said linked bonus game on said primary display.

31. The method of claim 29 wherein displaying said linked bonus game comprises displaying said linked bonus game on said linked game display.

32. The method of claim 25, further comprising, prior to displaying on said one or more linked gaming devices said one or more linked game outcomes, accepting at said one or more linked gaming devices wagers corresponding to said one or more linked games.

33. A gaming system for providing a game in response to a wager comprising:

a primary gaming device comprising: (a) a primary display for displaying a primary game, (b) a linked game display, and (c) one or more inputs for accepting wagers; and one or more linked gaming devices, each of said linked gaming devices displaying one or more linked games, each of said linked gaming devices adapted to forward linked game information to said primary gaming device;

wherein said linked game display is adapted to display one or more of said one or more linked games and said one or more inputs are adapted to accept wagers relating to one or more of said one or more linked games, wherein said linked game display is adapted to display depictions of said linked games in real time.

34. The gaming system of claim 33 wherein said one or more inputs for accepting wagers comprises one or more touch screen devices.

35. The gaming system of claim 34 wherein said primary display is provided on a primary display screen and said linked game display is provided on a secondary display screen, said one or more touch screen devices comprising a primary touch screen device associated with said primary display screen and a secondary touch screen device associated with said secondary display screen.

36. The gaming system of claim 35 wherein said primary touch screen is adapted to accept wagers on said primary game and said secondary touch screen is adapted to accept wagers on said one or more linked games.

37. The gaming system of claim 33 wherein said linked game display is further adapted to display historical information regarding said one or more linked games, said historical information being selected from a group consisting of a total number of plays of said one or more linked games, a total number of wins of said one or more linked games, a total payout of said one or more linked games, and a total number of bonus games awarded by said one or more linked games.

38. The gaming system of claim 33 further comprising a wager termination input adapted to terminate wagering on said one or more linked games.

* * * * *